C. SCHROEDER.
SPRING TRAP.
APPLICATION FILED NOV. 17, 1919.
1,339,481.
Patented May 11, 1920.
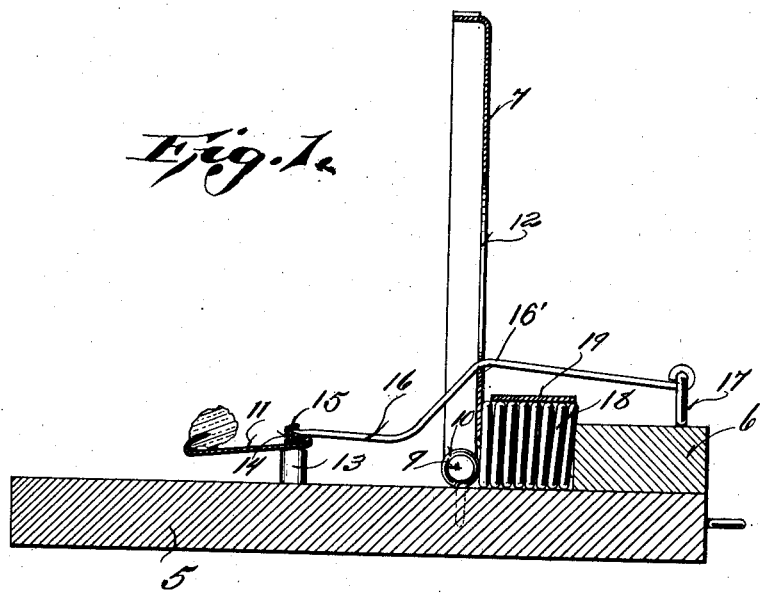
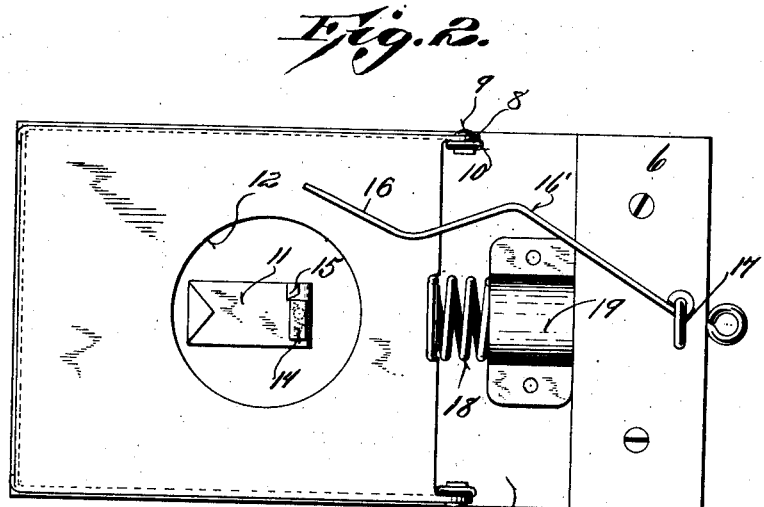
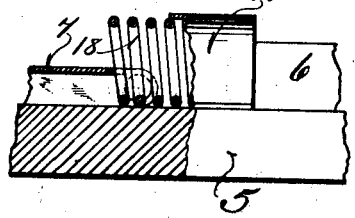
Inventor:
Charles Schroeder

UNITED STATES PATENT OFFICE.

CHARLES SCHROEDER, OF NEILLSVILLE, WISCONSIN.

SPRING-TRAP.

1,339,481.   Specification of Letters Patent.   Patented May 11, 1920.

Application filed November 17, 1919. Serial No. 338,716.

*To all whom it may concern:*

Be it known that I, CHARLES SCHROEDER, a citizen of the United States, and resident of Neillsville, in the county of Clark and State of Wisconsin, have invented certain new and useful Improvements in Spring-Traps; and I do hereby declare that the following is a full, clear, and exact description thereof.

My invention relates to new and useful improvements in traps for rats, mice or similar animals, and more particularly of that type comprising a base member on which is mounted a spring urged jaw adapted to be held in set position by a holding link which is releasable by a bait trigger disposed in the range of striking action of the spring jaw.

It is in general the object of my invention to simplify and otherwise improve the structure and to increase the efficiency and ease of manipulation of traps of this character.

A more specific and important object resides in the provision of an arrangement wherein the holding link for the spring jaw of the trap is associated with the jaw in such manner in set position thereof, as to receive a minimum violence of movement upon release of the spring jaw.

A further object is the provision of a trap of this character, wherein the spring element may be in the form of a single helical section engaging the jaw member.

A still further object resides in the provision of a trap having its jaw member formed of a single plate of sheet metal, whereby a maximum strength and adequate weight may be provided for said jaw, together with the provision of sharp striking edges.

With the above and other objects and advantages in view, which will be apparent as the description proceeds, my invention resides in the novel features of construction, combination and arrangement of parts which will be hereinafter more particularly described and defined by the appended claims.

In the accompanying drawings:

Figure 1 is a vertical longitudinal sectional view through a trap constructed in accordance with my invention, the trap being shown in set position of its parts.

Fig. 2 is a plan view of the trap with its parts in released position, and

Fig. 3 is a detail sectional view through the spring structure of the trap, in released position.

Referring now more particularly to the accompanying drawing, I provide a base member which is formed in the present instance of a block of wood 5 having a strip 6 secured transversely on one end thereof, and the jaw of my trap is formed of a plate of sheet metal 7 having side edge portions and one edge portion laterally bent to provide striking edges coöperating with the surface of the base member 5. The laterally turned side edge portions of the plate are extended past the other end of the body of the plate to provide a pair of pivot ears 8 connected by rivets 9 with a pair of eye members 10 upstanding from the sides of the base 5 and spaced inwardly of the strip 6.

A bait trigger 11 is disposed on the base 5 adjacent the center thereof, and the jaw plate 7 is provided with a substantially central clearance aperture 12 for said trigger. This trigger member comprises a strip of metal having one end bent to provide a bait receiving hook portion, and having its other end loosely mounted on a fulcrum sleeve 13, a nail member 14 being passed through the trigger plate and through the sleeve and into the base member 5, and having a transverse head portion engaged by a reverse bend of the adjacent end of the trigger plate to hold the trigger plate against pivotal movement in a horizontal plane, while permitting tilting movement of the trigger plate to procure its release action, said end of the trigger plate terminating in a recess portion 15 for the reception of the free end of a jaw holding rod 16 which is extended through the clearance aperture 12 of the jaw plate and which is pivoted to an eye 17 on the base strip 6. The end portions of the holding rod are offset and connected by a mutually oblique intermediate portion forming a cam shoulder 16' engageable by the innermost portion of the edge of the opening 12 of the jaw plate when the jaw plate is raised to upright position and the free end of the rod is engaged in the recess 15, placing the springs means of the trap under tension. This spring means comprises a simple single section of helical spring 18 disposed between the ledge 6 and the jaw plate 7, and bearing at its ends thereagainst, the spring being surrounded by a channel strip of metal 19 into which the spring is compressed when the jaw is raised, and from which the forward end of the spring extends in the closing movement of the jaw plate, the forward end convolutions of the spring engaging in notches cut in the inner edge of the jaw plate whereby to hold the spring in place in the last portion of closing movement of the plate. It is noted that by reason of the extension of the pivot ears 9 of the jaw plate past the inner edge of the plate, the spring exerts a maximum leverage at the outset of the closing movement of the jaw plate, this leverage being decreased as the movement proceeds, and it is further noted that by stamping the plate from a sheet of metal, having its edges bent as described, a maximum strength of structure is afforded and a sufficient weight is provided to procure a crushing impact of the striking edges of the jaw plate.

The holding rod 16 of the jaw plate engages a holding edge of the plate disposed inwardly of the striking edge with respect to the pivot axis of the plate and thus a minimum spring leverage is exerted against the holding rod, and the movement imparted thereto on release of the jaw will be of minimum violence, thus materially tending to increase the durability of the trap upon continued use.

I have thus provided an exceedingly simple and readily manipulated trap structure which compasses the objects heretofore set out, and while I have shown and described a preferred embodiment of my invention, it will be appreciated that various changes and modifications of structure may be employed to meet different conditions of use and manufacture, without departing in any manner from the spirit of my invention.

What is claimed is:

1. A trap of the class described comprising a base member, a jaw member pivoted on the base member and provided with a striking edge and with a holding edge disposed inwardly of the striking edge with respect to the pivot axis of the jaw, a bait trigger movably mounted on the base member, and a holding member mounted on the base member and detachably engageable with said bait trigger and with the holding edge of the jaw member.

2. A trap of the class described comprising a base member, a jaw member having a striking edge and provided with a holding edge portion extending transversely of the jaw and located between said striking edge and the pivot axis of the jaw, a bait trigger loosely mounted on the base member and located between the striking edge and holding portion in closed position of the jaw, and a holding rod pivoted to the base member rearwardly of the jaw and adapted to extend across the holding portion of the jaw in holding engagement therewith and in detachable engagement with the bait trigger.

3. A trap of the class described comprising a base member, a jaw member having a striking edge and provided with a holding edge portion extending transversely of the jaw and located between said striking edge and the pivot axis of the jaw, a bait trigger loosely mounted on the base member and located between the striking edge and holding portion in closed position of the jaw, a holding rod pivoted to the base member rearwardly of the jaw and adapted to extend across the holding portion of the jaw in holding engagement therewith and in detachable engagement with the bait trigger, and a cam shoulder on said holding member engageable with the holding portion of the jaw.

4. A trap of the class described comprising a base member, a jaw member pivoted on the base member and formed of a plate of metal having its edge portion laterally turned to provide a striking edge, means urging said jaw plate to move against the base member, a bait trigger movably mounted on the base member, said jaw plate being provided with an aperture providing clearance for said bait member, a holding rod pivoted to the base member rearwardly of the jaw and adapted to extend from the aperture of the jaw for detachable connection with the bait trigger, said holding rods having an intermediate cam shoulder engageable with the inner edge portion of the clearance aperture.

5. A trap of the class described comprising a base member, a jaw member pivoted on the base member and having a spring engaging portion disposed adjacent its pivotal axis, a helical coil spring on the base member loosely engageable with said portion of the jaw member and trigger control means for holding said jaw member in retracted position.

6. A trap of the class described comprising a base member, a jaw member pivoted at spaced points on the base member and having a spring engaging portion disposed inwardly of its pivotal axis, a shoulder on the base member outwardly of the pivot axis of the jaw, a helical coil spring disposed between said shoulder and said engaging portion of the jaw, a member surrounding the coil spring adjacent the shoulder, and trigger control means for holding said jaw member in retracted position.

In testimony that I claim the foregoing I have hereunto set my hand at Neillsville, in the county of Clark, and State of Wisconsin.

CHARLES SCHROEDER.